(12) United States Patent
Itoh et al.

(10) Patent No.: US 9,892,727 B2
(45) Date of Patent: Feb. 13, 2018

(54) METHOD OF SELECTING TRAINING TEXT FOR LANGUAGE MODEL, AND METHOD OF TRAINING LANGUAGE MODEL USING THE TRAINING TEXT, AND COMPUTER AND COMPUTER PROGRAM FOR EXECUTING THE METHODS

(71) Applicant: INTERNATIONAL BUSINESS MACHINES CORPORATION, Armonk, NY (US)

(72) Inventors: Nobuyasu Itoh, Kanagawa (JP); Gakuto Kurata, Tokyo (JP); Masafumi Nishimura, Kanagawa-ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/965,088

(22) Filed: Dec. 10, 2015

(65) Prior Publication Data

US 2016/0163309 A1 Jun. 9, 2016

Related U.S. Application Data

(63) Continuation of application No. 14/803,324, filed on Jul. 20, 2015.

(30) Foreign Application Priority Data

Jul. 24, 2014 (JP) ................................ 2014-150554

(51) Int. Cl.
*G10L 15/06* (2013.01)
*G10L 15/26* (2006.01)
(Continued)

(52) U.S. Cl.
CPC .......... *G10L 15/063* (2013.01); *G10L 15/065* (2013.01); *G10L 15/197* (2013.01); *G10L 15/26* (2013.01); *G10L 2015/0631* (2013.01)

(58) Field of Classification Search
CPC combination set(s) only.
See application file for complete search history.

(56) References Cited

U.S. PATENT DOCUMENTS

| | | | |
|---|---|---|---|
| 2005/0256715 A1* | 11/2005 | Okimoto | ............. G06F 17/2715 704/257 |
| 2012/0089397 A1* | 4/2012 | Arai | ...................... G10L 15/063 704/251 |
| 2016/0027433 A1 | 1/2016 | Itoh et al. | |

FOREIGN PATENT DOCUMENTS

| | | |
|---|---|---|
| JP | 2012-078647 A | 4/2012 |
| JP | 2012-083543 A | 4/2012 |

OTHER PUBLICATIONS

Robert C. Moore et al., ""Intelligent Selection of Language Model Training Data"", Proceedings of the ACL 2010 Conference Short Papers, 2010, pp. 220-224, available from <URL:http://anthology.aclweb.org//P/P10/P10-2041.pdf>.

(Continued)

*Primary Examiner* — Marivelisse Santiago Cordero
*Assistant Examiner* — Keara Harris
(74) *Attorney, Agent, or Firm* — Cantor Colburn LLP

(57) ABSTRACT

Method of selecting training text for language model, and method of training language model using the training text, and computer and computer program for executing the methods. The present invention provides for selecting training text for a language model that includes: generating a template for selecting training text from a corpus in a first domain according to generation techniques of: (i) replacing one or more words in a word string selected from the corpus in the first domain with a special symbol representing any (Continued)

word or word string, and adopting the word string after replacement as a template for selecting the training text; and/or (ii) adopting the word string selected from the corpus in the first domain as the template for selecting the training text; and selecting text covered by the template as the training text from a corpus in a second domain different from the first domain.

7 Claims, 9 Drawing Sheets

(51) Int. Cl.
*G10L 15/197* (2013.01)
*G10L 15/065* (2013.01)

(56) References Cited

OTHER PUBLICATIONS

Amittai Axelrod et al., ""Domain Adaptation via Pseudo In-Domain Data Selection"", Proceeding EMNLP '11 Proceedings of the Conference on Empirical Methods in Natural Language Processing, 2011, pp. 355-362, available from <URL: http://research.microsoft.com/pubs/155466/emnlp11-select-train-data.pdf>.

Karl Weilhammer et al., ""Bootstrapping Language Models for Dialogue Systems"", Proceedings of the International Conference on Spoken Language Processing. Version: 1,0 (Final) Distribution: public TALK D6.4 (Part II), Dec. 20, 2006, pp. 59-60, available from <URL: http://svr-www.eng.cam.ac.uk/-sjy/papers/wesy06.pdf>.

Sameer Maskey et al., ""Resampling Auxiliary Data for Language Model Adaptation in Machine Translation for Speech"", ICASSP, IEEE, pp. 4817-4820, 2009, available from <URL: http://www1.cs.columbia.edu/-smaskey/papers/lm-adapt-icassp09.pdf>.

Ruhi Sarikaya et al., ""Rapid Language Model Development using External Resources for New Spoken Dialog Domains"", ICASSP, IEEE, pp. 573-576, 2005, available from <URL: http://academic-commons.columbia.edu/download/fedora_content/download/ac:162704/CONTENT/sarikaya_al_05.pdf>.

David Guthrie et al., ""A Closer Look at Skip-gram Modelling"", Proceedings of the Fifth international Conference on Language Resources and Evaluation LREC-2006, Genoa, Italy, 2006, pp. 1222-1225, available from <URL:http://homepages.inf.ed.ac.uk/ballison/pdf/lrec_skipgrams.pdf>.

List of IBM Patents or Patent Applications Treated as Related.

List of IBM Patents or Patent Applications Treated as Related; (Appendix P), Filed Aug. 25, 2016, 2 pages.

* cited by examiner

[Figure 1]
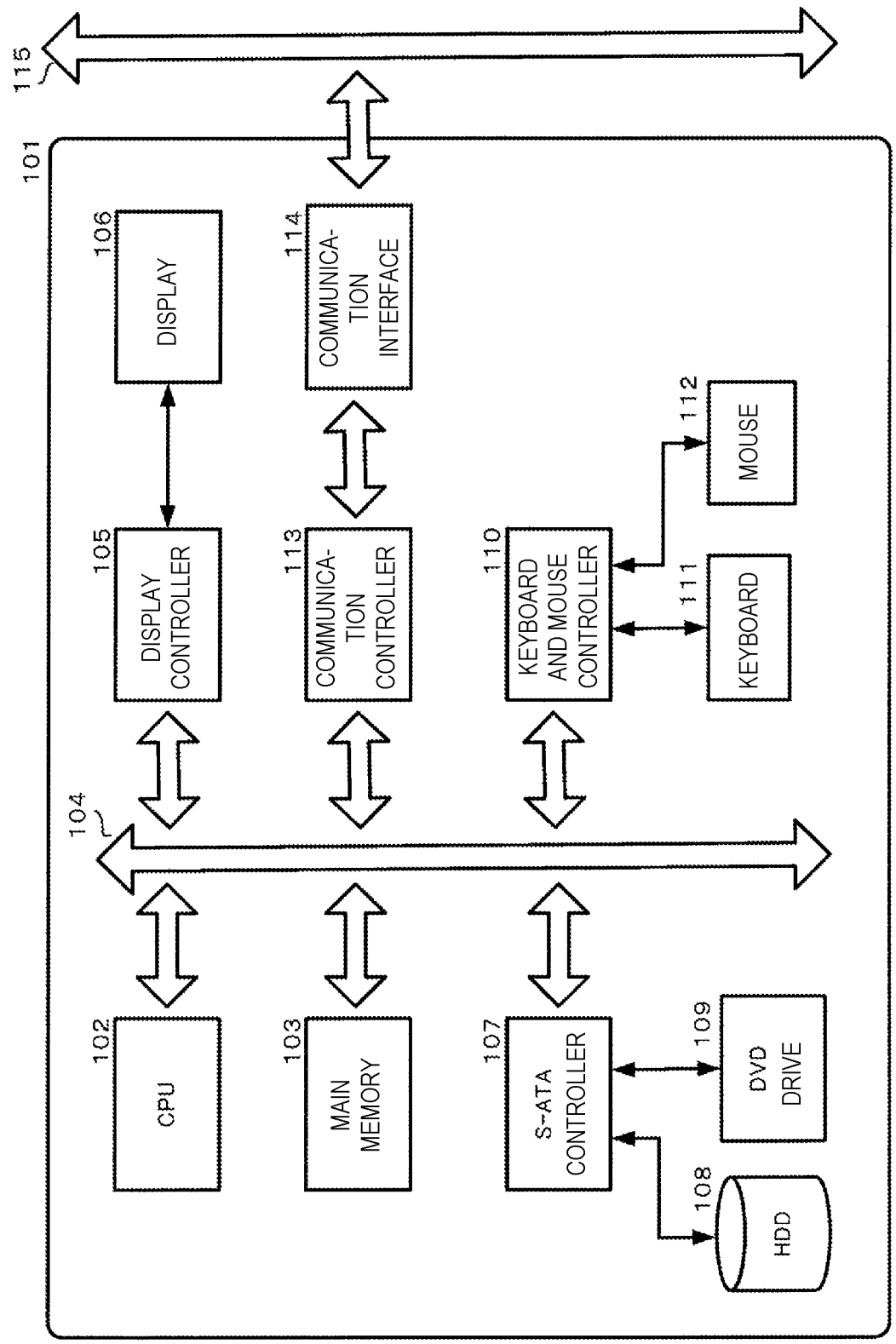

[Figure 2A]
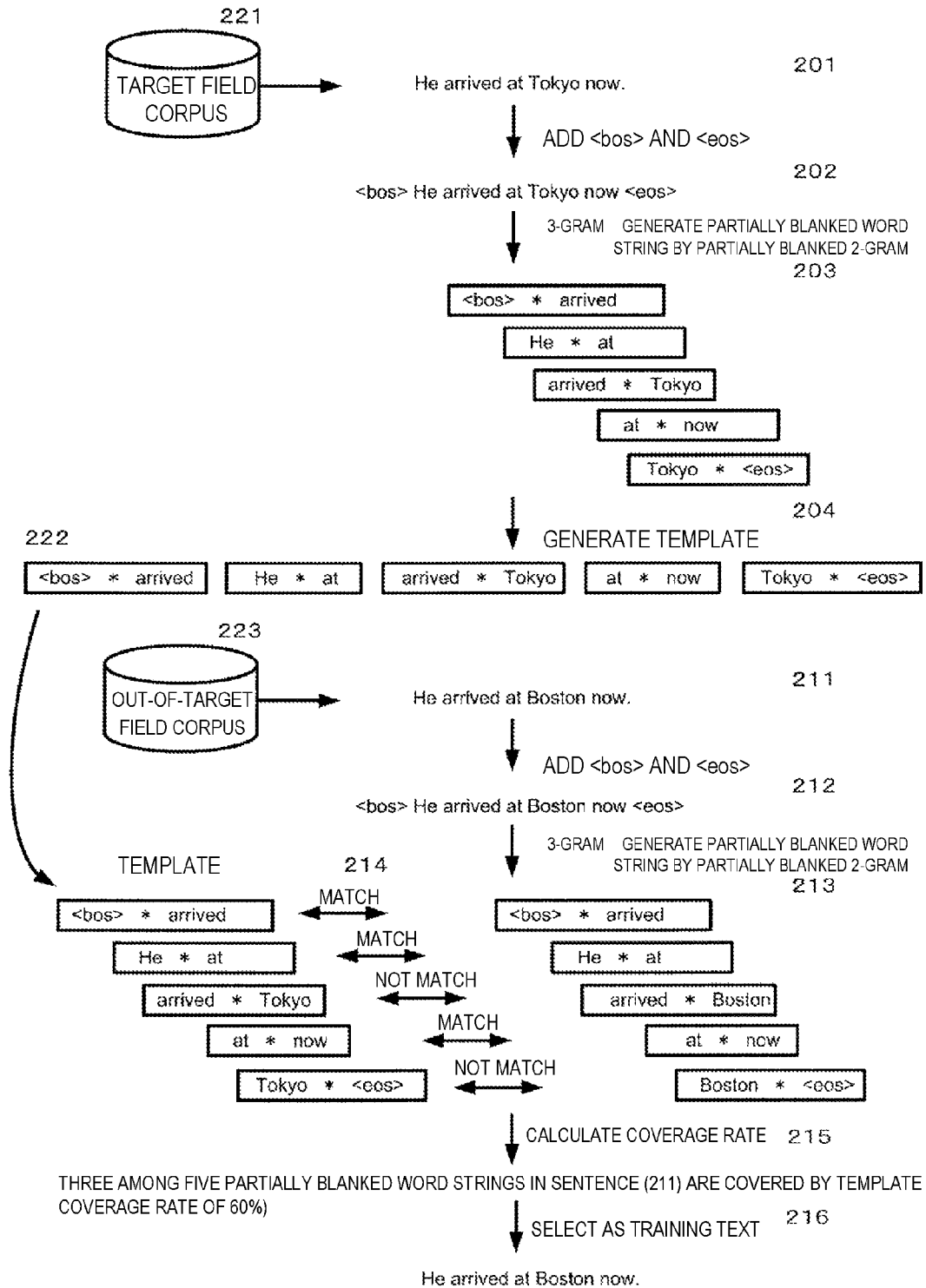

[Figure 3A]
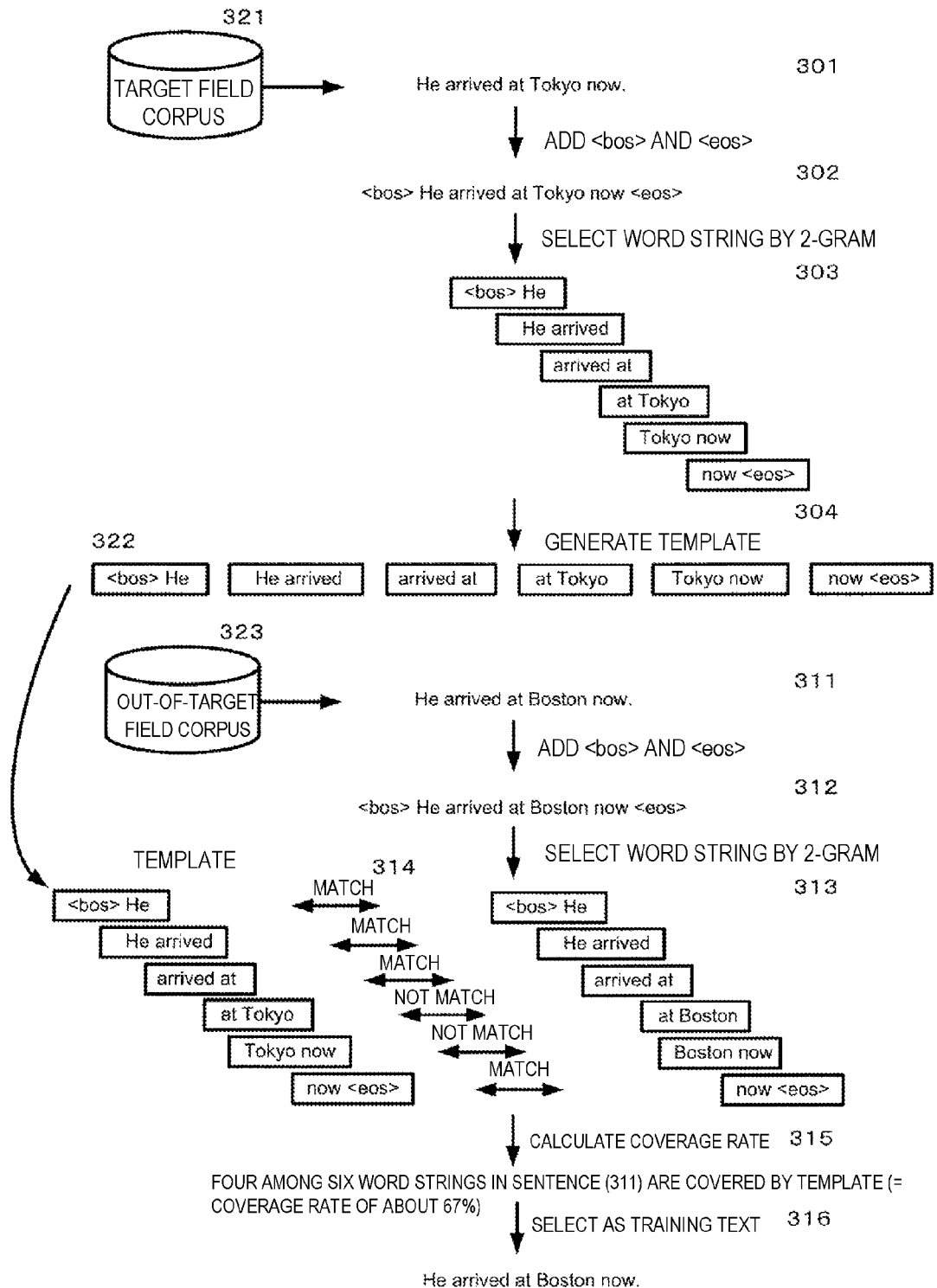

[Figure 4A]
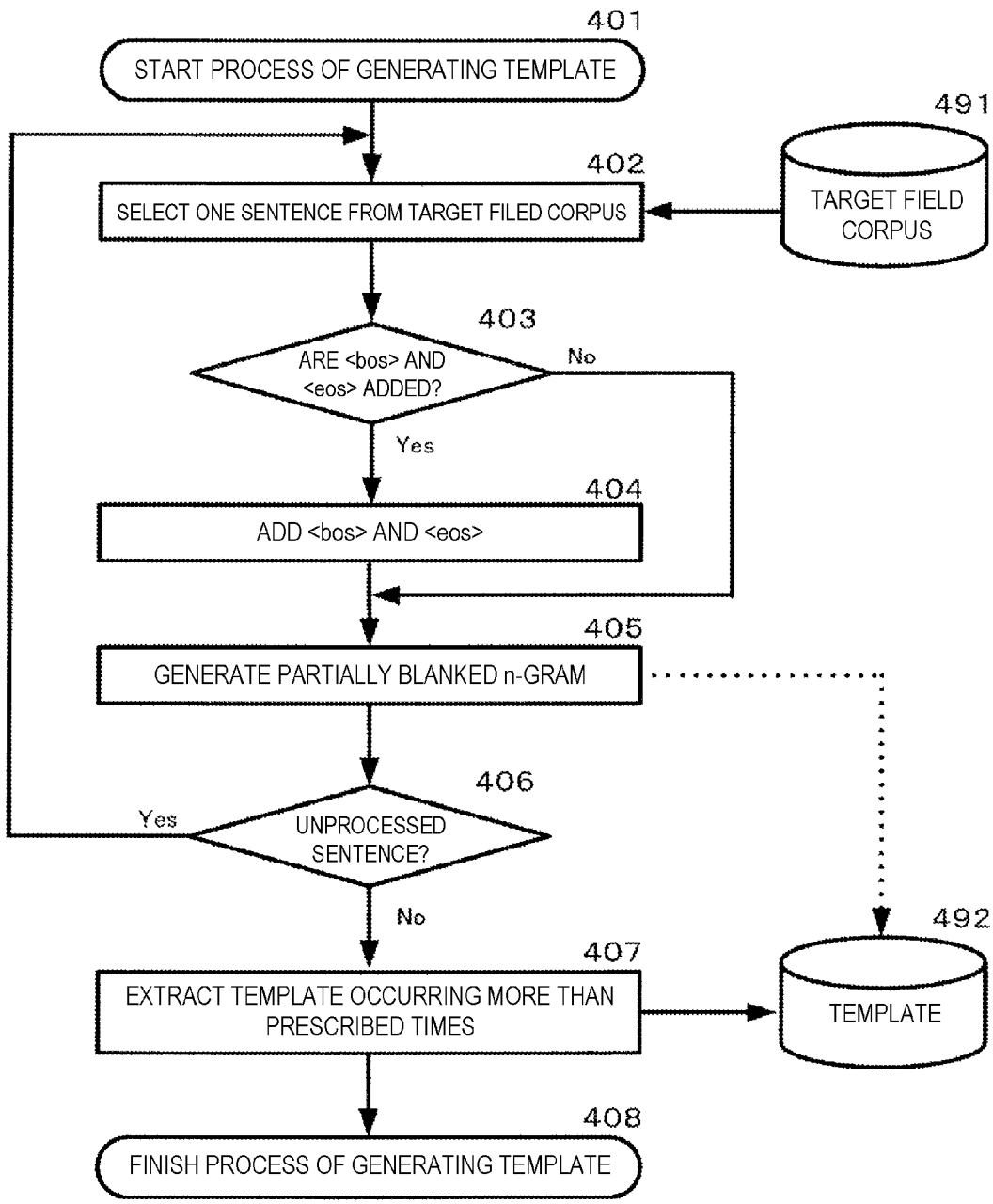

[Figure 4B]
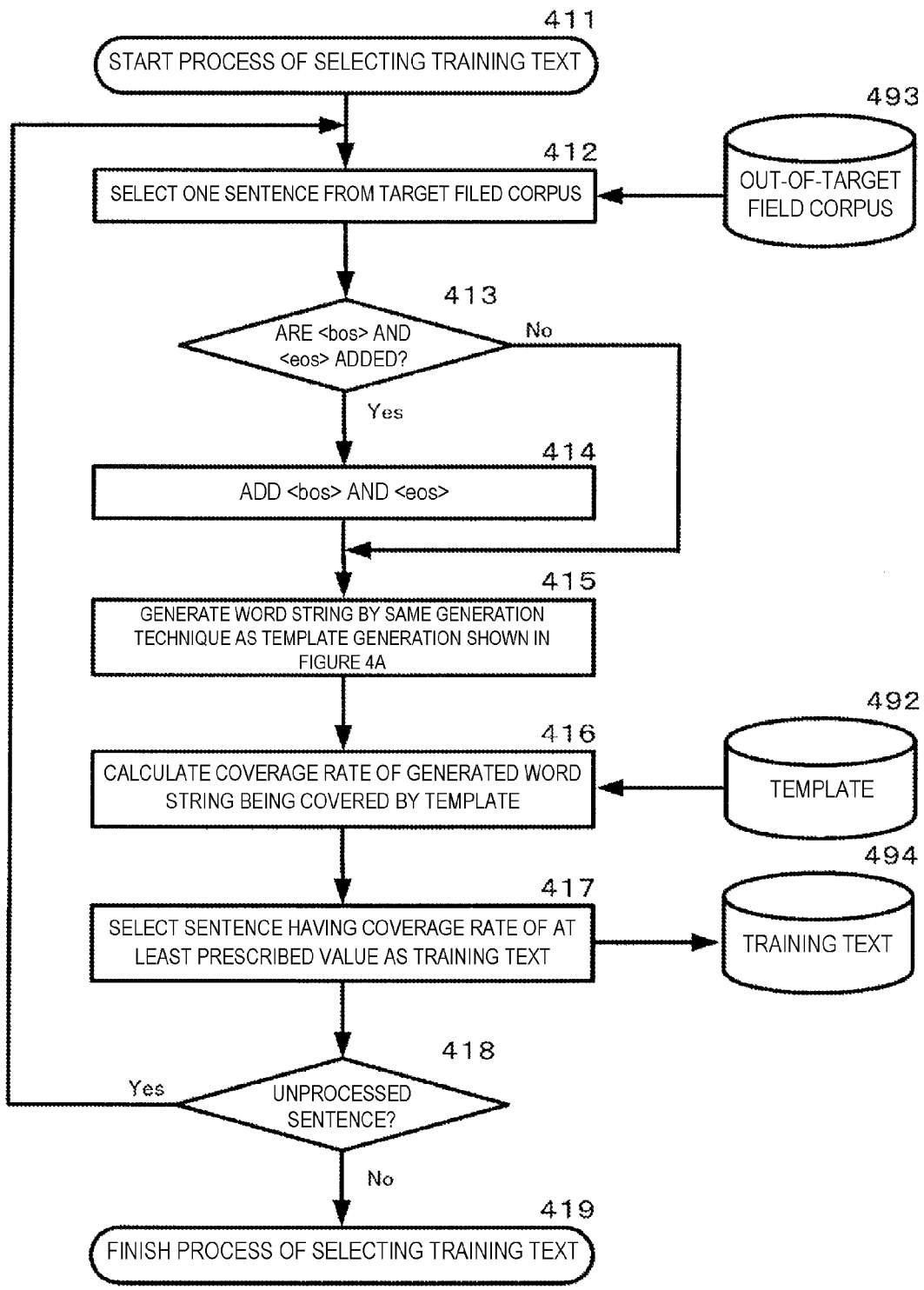

[Figure 5A]
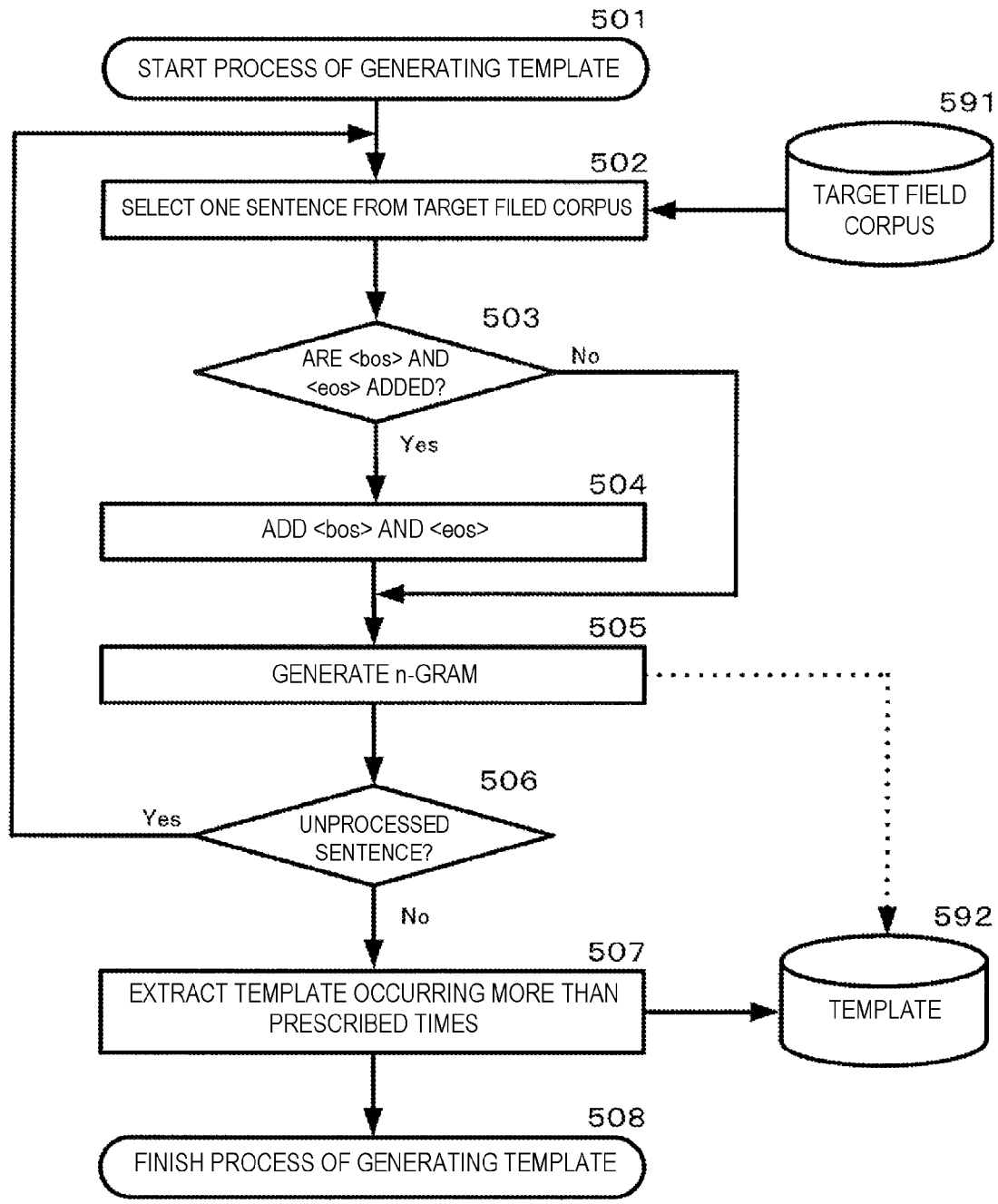

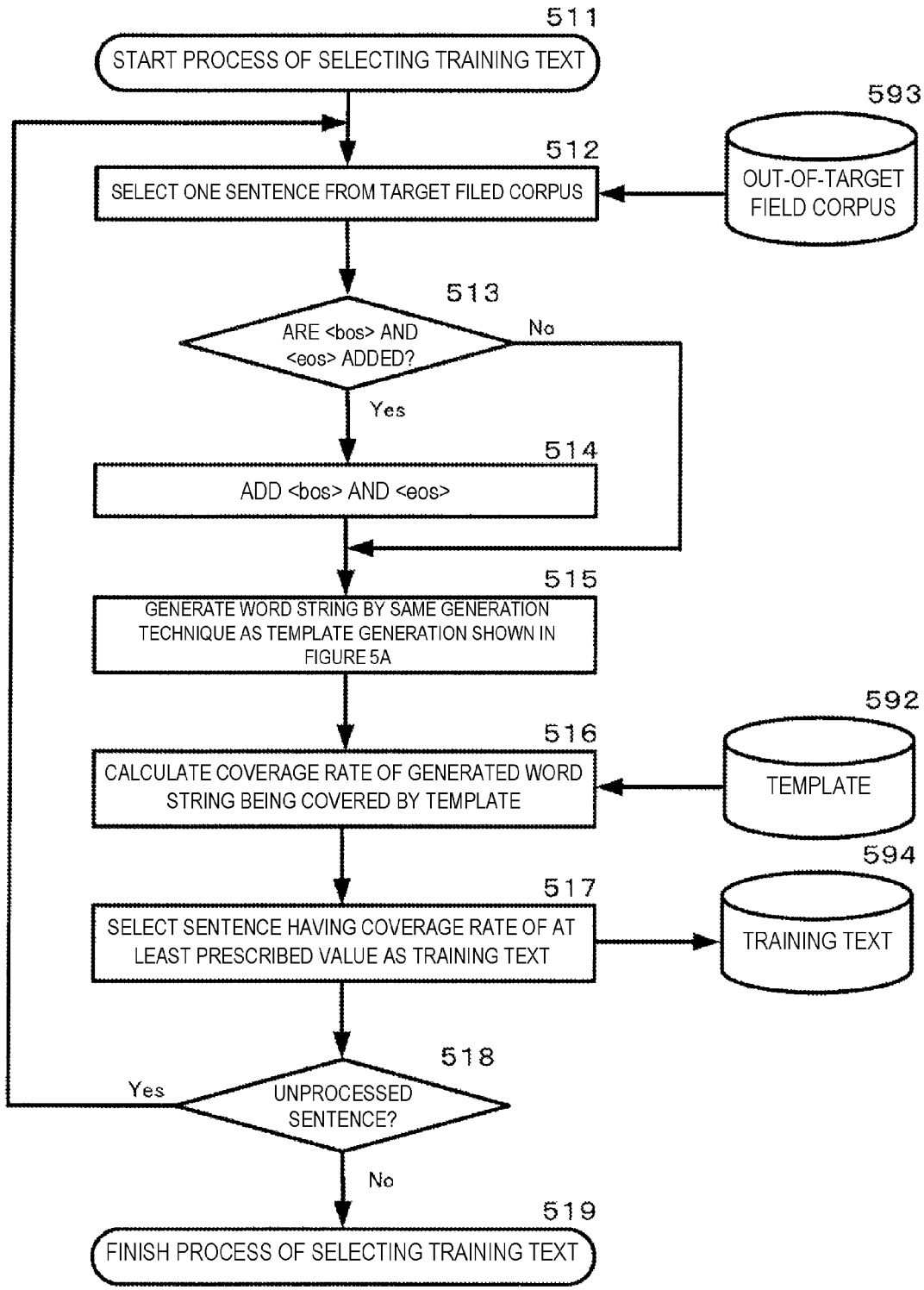

[Figure 6]
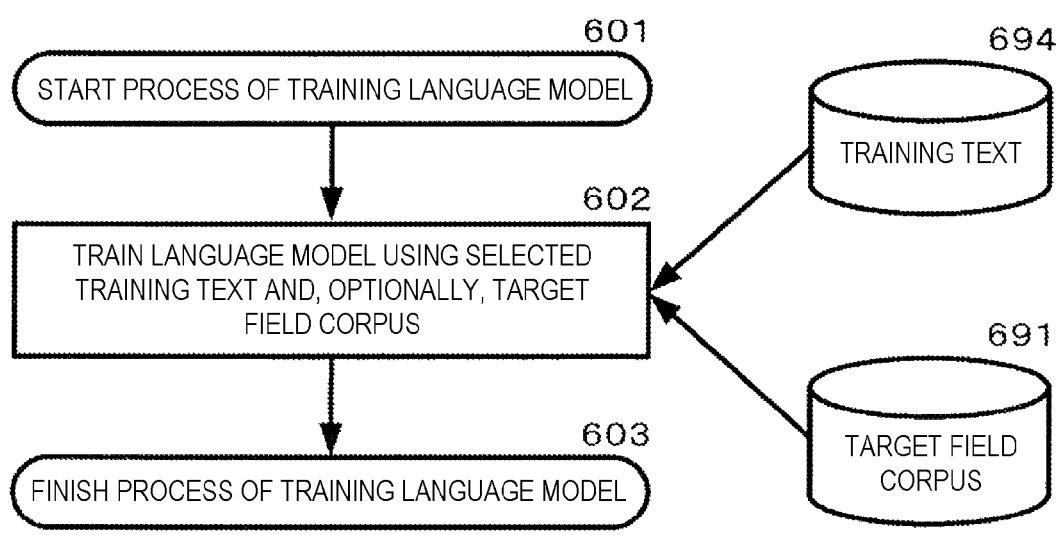

[Figure 7]
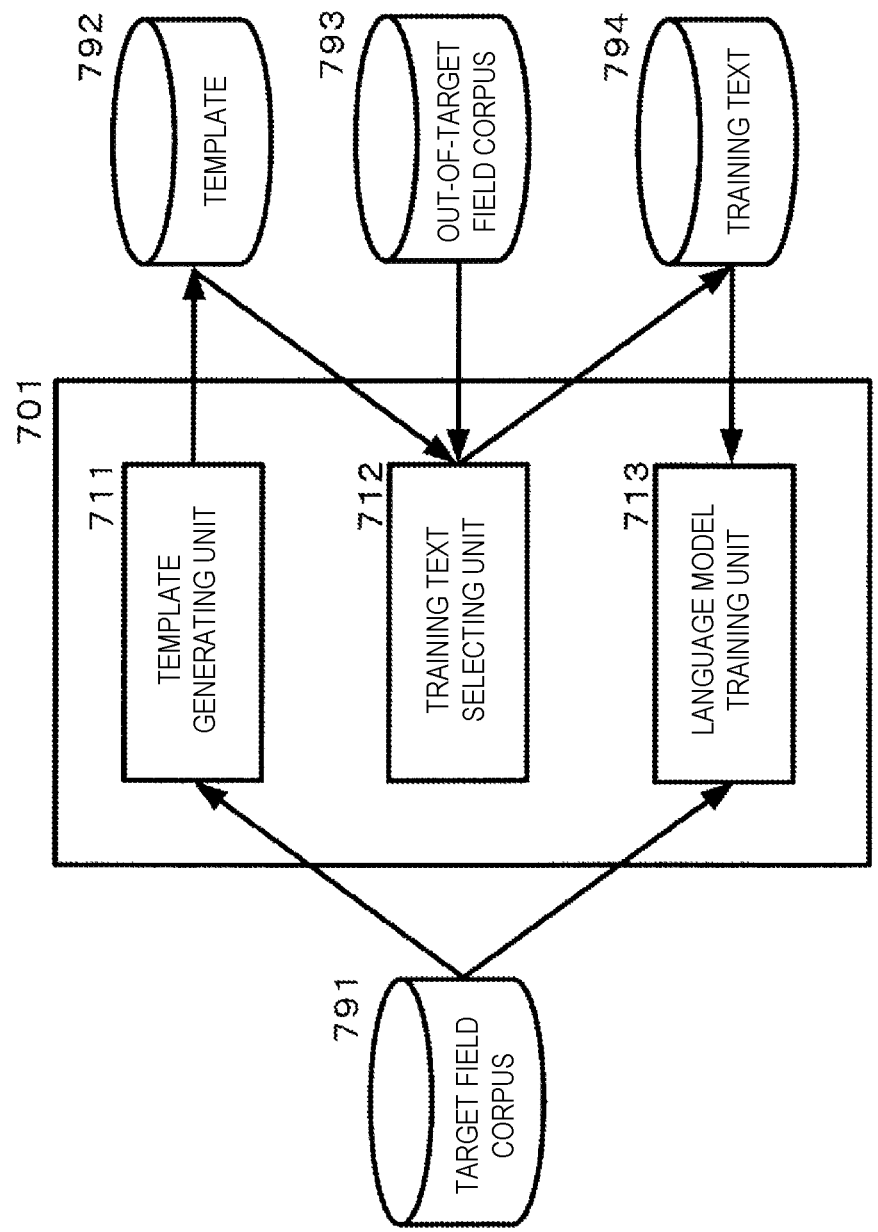

METHOD OF SELECTING TRAINING TEXT FOR LANGUAGE MODEL, AND METHOD OF TRAINING LANGUAGE MODEL USING THE TRAINING TEXT, AND COMPUTER AND COMPUTER PROGRAM FOR EXECUTING THE METHODS

CROSS REFERENCE TO RELATED APPLICATION

This application is a Continuation of co-pending U.S. patent application Ser. No. 14/803,324, filed on Jul. 20, 2015, which claims priority from Japanese Patent Application No. 2014-150554, filed Jul. 24, 2014. The entire contents of both applications are incorporated herein by reference.

TECHNICAL FIELD OF THE INVENTION

The present invention relates to a technique for improving a language model (LM). More specifically, the present invention relates to a technique for selecting training text for a language model, and a technique for training a language model using the selected training text.

BACKGROUND OF THE INVENTION

In an automatic speech recognition (ASR) technique, a statistical language model plays an important role. The statistical language model is acquired by modeling appearance frequency information on a word or multiple words (hereinafter, also referred to as a "word string") in a corpus that contains a large amount of natural language sentences.

Training a language model requires a training corpus collected from a field most matching with a target field (also referred to as a "target domain") of an automatic speech recognition application. Constructing a training corpus requires an enormous amount of sentences in a target field (hereinafter, also referred to as a "target field corpus"). Unfortunately, the amount of natural language sentences associated with the target field is typically limited. Therefore, it is difficult to collect a large amount of corpora in the target field. In particular, where a target field is a specialized field (e.g., a financial field, a scientific field), it is further difficult to collect a corpus in the target field.

Typically, collecting a large amount of natural language training sentences requires a dictating operation where a person listens to an utterance in the target field and the person converts the utterance into a text sentence. However, since this operation is manually performed, the cost is high. Accordingly, the amount of text sentences easily acquired by a manual process is limited.

In such a situation, machine-readable documents that can be relatively easily collected can be used. For instance, enormous amounts of newspapers, crawled web text, or social networking services (e.g., Facebook®, Twitter®, Google+®, Myspace®, LinkedIn® and LINE® in the world, and, e.g., Mixi®, GREED, Mobage® and Ameba® in Japan) (hereinafter, also referred to as an "out-of-target-field corpus"). Techniques of selecting natural language sentences required for training a language model using such machine-readable documents have been developed.

However, it is insufficient to just increase the amount of natural language sentences. It is desirable to construct a language model from an appropriate natural language sentence in conformity with the target field of an application (e.g., automatic speech recognition application) to which the language model is applied.

Accordingly, training a language model using sentences contained in a small-scale corpus in the target field and an enormous amount of sentences in out-of-target-field corpora is a practical scenario.

Thus, selection of sentences from out-of-target-field corpora has been researched with using a statistical model estimated from corpora in the target field.

Japanese patent JP2012-78647A describes a language model training apparatus used together with means for storing a machine-readable corpus that stores a corpus containing multiple natural language sentences for training a language model suitable to a specific usage from the corpus. The apparatus includes: a template storing means for storing a word string template preliminarily prepared for the specific usage, a word string extracting means for extracting from the corpus a word string pattern matching with the word string template stored in the template storing means, a transformation means for transforming the word string pattern extracted by the word string extracting means on the basis of a transformational rule preliminarily prepared for generating word strings in a natural language having a form along with a preliminarily selected purpose, and a training means for training the language model using word strings output from the transformation means as training data.

Japanese patent JP2012-83543A describes a language model generating device including: a corpus analyzing means for analyzing text in a corpus including a set of world wide web (web) pages, an extracting means for extracting at least one word appropriate for a document type set according to a speech recognition target based on an analysis result by the corpus analyzing means, a word set generating means for generating a word set from the at least one word extracted by the extracting means, a web page acquiring means for causing a retrieval engine to perform a retrieval process using the word set generated by the word set generating means as a retrieval query of the retrieval engine on the Internet and acquiring a web page linked from the retrieval result, and a language model generating means for generating a language model for speech recognition from the web page acquired by the web page acquiring means.

David Guthrie et al., "A Closer Look at Skip-gram Modelling" describes a method of using skip-grams for solving the problem of data sparsity (Abstract). As indicated in "2-skip-bi-grams" and "2-skip-tri-grams" described in the section of "2. Defining skip-grams" on page 1222, according to skip-grams, one word in a word string is deleted, words before and after the deleted word are caused to be adjacent to each other, thereby making a bi-gram and a tri-gram.

SUMMARY OF THE INVENTION

The present invention provides a method of selecting training text for a language model, a computer for selecting training text for a language model, and a computer program for selecting training text for a language model and a computer program product therefor. Furthermore, the present invention provides a method of training a language model, a computer for training a language model, and a computer program for training a language model and a computer program product therefor.

In one embodiment of the present invention, a computer-implemented method of selecting training text for a language model is provided. The method includes: generating a template for selecting training text from a corpus in a first domain by replacing one or more words in a word string selected from the corpus in the first domain with a special symbol representing any word or word string and adopting the word string replaced with the special symbol as a template for selecting the training text; and selecting text covered by the template as the training text from a corpus in a second domain different from the first domain.

In another embodiment of the present invention, a computer-implemented method of selecting training text for a language model is provided. The method includes: generating a template for selecting training text from a corpus in a first domain by adopting the word string selected from the corpus in the first domain as the template for selecting the training text; and selecting text covered by the template as the training text from a corpus in a second domain different from the first domain.

In another embodiment of the present invention, a computer for selecting training text for a language model is provided. The computer includes: a template generating unit for generating a template for selecting training text from a corpus in a first domain according to at least one generation technique of: (i) replacing one or more words in a word string selected from the corpus in the first domain with a special symbol representing any word or word string, and adopting the word string replaced with the special symbol as a template for selecting the training text; and/or (ii) adopting the word string selected from the corpus in the first domain as the template for selecting the training text. The computer further includes: a training text selecting unit of selecting text covered by the template as the training text from a corpus in a second domain different from the first domain.

In another embodiment of the present invention, a computer for training a language model is provided. The computer includes: a template generating unit for generating a template for selecting training text from a corpus in a first domain according to at least one generation technique of: (i) replacing one or more words in a word string selected from the corpus in the first domain with a special symbol representing any word or word string, and adopting the word string replaced with the special symbol as a template for selecting the training text; and/or (ii) adopting the word string selected from the corpus in the first domain as the template for selecting the training text. The computer further includes: a training text selecting unit for selecting text covered by the template or text having a coverage rate of at least a prescribed value as the training test from a corpus in a second domain different from the first domain, the coverage rate being a rate covered by the template; and a language model training unit for training the language model using the selected text.

BRIEF DESCRIPTION OF THE DRAWINGS

FIG. 1 is a diagram showing an example of a computer usable in an embodiment of the present invention;

FIG. 2A shows a diagram for the case where according to the embodiment of the present invention, one or more words in a word string selected from a target field corpus (English) are replaced with a special symbol, and the word string after replacement is selected as a template for selecting training text;

FIG. 3A shows a diagram for the case where according to the embodiment of the present invention, the word string selected from the target field corpus (English) is adopted as a template for selecting training text;

FIG. 4A shows a flowchart for a process of replacing one or more words in a word string selected from a target field corpus with a special symbol, and adopting the word string after replacement as a template for selecting training text, according to the embodiment of the present invention;

FIG. 4B shows a flowchart for a process of selecting text covered by the template generated by the process shown in FIG. 4A as training text from an out-of-target field corpus, according to the embodiment of the present invention;

FIG. 5A shows a flowchart for a process of adopting a word string selected from a target field corpus as a template for selecting training text, according to the embodiment of the present invention;

FIG. 5B shows a flowchart for showing a process of selecting text covered by the template generated in FIG. 5A as training text from the out-of-target field corpus, according to the embodiment of the present invention;

FIG. 6 shows a flowchart for a process of training a language model using the training text selected in the process in FIG. 4B or FIG. 5B, according to the embodiment of the present invention; and FIG. 7 is a diagram showing an example of a functional block diagram of a computer that preferably has a hardware configuration according to FIG. 1, and executes the embodiment of the present invention.

DETAILED DESCRIPTION OF PREFERRED EMBODIMENTS

The present invention has an object to provide a technique of efficiently collecting a sentence similar to a sentence contained in a target field corpus from an out-of-target-field corpus, which is a corpus in a field other than that of the target field corpus. Furthermore, the present invention provides a technique of collecting, from an out-of-target-field corpus, a sentence similar to a sentence contained in a target field corpus without using a statistical model estimated from the target field corpus. In addition, the present invention has a technique of collecting, from an out-of-target-field corpus, a sentence similar to a sentence contained in a target field corpus, irrespective of an unknown word, even if the unknown word is in the sentence.

In a certain method of selecting a sentence from an out-of-target-field corpus using a statistical model estimated from a corpus in a target field, a sentence having a high generation probability may be selected from the out-of-target-field corpus on the basis of the statistical model. The selection based on the statistical model can sufficiently function in the case of a small vocabulary. Unfortunately, the number of vocabulary items has recently become enormous (e.g., a vocabulary including at least one million items at the maximum), and a language model is required to be trained using the large vocabulary. Accordingly, selection of sentences having a high generation probability from the out-of-target-field corpus does not sufficiently function. For instance, in the case of an essentially related sentence, only the presence of an unknown word significantly reduces the probability for the sentence.

For instance, a corpus in the target field including one sentence that is "Arrived at Tokyo now" (which is an English sentence) is discussed. It is assumed that an out-of-target-field corpus contains a sentence, "Arrived at Boston now", similar to the previous sentence. In this case, the out-of-target-field corpus contains the sentence, "Arrived at Boston now", but the corpus in the target field does not include "Boston". Accordingly, a language model estimated from "Arrived at Tokyo now" provides a significantly low generation probability with respect to the sentence, "Arrived at Boston now" contained in the out-of-target-field corpus, because of the large size of vocabulary.

In one embodiment of the present invention, the step of selecting the text covered by the template includes: generating a word string according to the same generation technique as the generation technique for the generated template with respect to each sentence of the corpus in the second domain; and selecting text covered by the template as the training text from the corpus in the second domain using the word string generated according to the same generation technique and the generated template.

In one embodiment of the present invention, the step of selecting the text covered by the template includes: generating a word string according to the same generation technique as the generation technique for the generated template with respect to each sentence in the corpus in the second domain; calculating a coverage rate of the word string generated according to the same generation technique being covered by the generated template; and selecting a sentence having the calculated coverage rate of at least a prescribed value as the training text.

In one embodiment of the present invention, the step of generating the template further includes: a step of extracting a template occurring more than prescribed times from among the generated templates. Furthermore, the step of selecting the text covered by the template includes: a step of selecting text covered by the template extracted from the corpus in the second domain as the training text.

In one embodiment of the present invention, the step of selecting the text covered by the template includes: generating a word string according to the same generation technique as the generation technique for the extracted template with respect to each sentence in the corpus in the second domain; and selecting the text covered by the template as the training text from the corpus in the second domain different from the first domain using the word string generated according to the same generation technique and the extracted template.

In one embodiment of the present invention, the step of selecting the text covered by the template may include the steps of: generating a word string according to the same generation technique as the generation technique for the extracted template with respect to each sentence in the corpus in the second domain; calculating a coverage rate of the word string generated according to the same generation technique being covered by the extracted template; and selecting a sentence having the calculated coverage rate of at least a prescribed value as the training text.

In one embodiment of the present invention, the training text selecting unit may generate a word string according to the same generation technique as the generation technique for the template generated by the template generating unit with respect to each sentence of the corpus in the second domain; and select text covered by the template as the training text from the corpus in the second domain different from the first domain using the word string generated according to the same generation technique and the generated template.

In one embodiment of the present invention, the training text selecting unit may generate a word string according to the same generation technique as the generation technique for the generated template with respect to each sentence in the corpus in the second domain; calculate a coverage rate of the word string generated according to the same generation technique being covered by the generated template; and select a sentence having the calculated coverage rate of at least a prescribed value as the training text.

In one embodiment of the present invention, the template generating unit may further extract a template occurring more than prescribed times from among the generated templates, and the training text selecting unit may select text covered by the template from the second domain as the training text.

In one embodiment of the present invention, the training text selecting unit may generate a word string according to the same generation technique as the generation technique for the extracted template with respect to each sentence in the corpus in the second domain; and select the text covered by the template as the training text from the corpus in the second domain different from the first domain using the word string generated according to the same generation technique as the generation technique for the extracted template.

In one embodiment of the present invention, the training text selecting unit may generate a word string according to the same generation technique as the generation technique for the extracted template with respect to each sentence in the corpus in the second domain; calculate a coverage rate of the word string generated according to the same generation technique being covered by the extracted template; and select a sentence having the calculated coverage rate of at least a prescribed value as the training text.

In a third embodiment of the present invention, a computer program and a computer program product cause a computer to execute each step of the method of selecting training text for a language model according to the first embodiment of the present invention.

In a fourth embodiment of the present invention, a method of training a language model executed by a computer includes the steps of: according to the method of selecting the training text for the language model according to the first embodiment of the present invention, generating a template for selecting the training text for the language model from the corpus in the first domain according to the method of selecting training text for a language model according to the first embodiment of the present invention, and selecting, as the training text, text covered by the template or text having a coverage rate of at least a prescribed value from the corpus in the second domain different from the first domain, the coverage rate being a rate covered by the template; and training the language model using the selected training text.

In a fifth embodiment of the present invention, a computer for training a language model includes the template generating unit and the training text selecting unit that are included in the computer according to the second embodiment of the present invention, and further includes a language model training unit of training the language model using the selected training text.

In a sixth embodiment of the present invention, a computer program and a computer program product cause a computer to execute each step of the method of training a language model according to the fourth embodiment of the present invention.

A computer program according to an embodiment of the present invention may be stored in any of computer-readable recording media, such as one or more of a flexible disk, MO, CD, DVD, BD, hard disk device, USB-connectable memory medium, ROM, MRAM, and RAM. The computer program may be downloaded from another data processing system, e.g., a computer, which is connected by a communication line, for being stored in the recording medium, or copied from another recording medium. The computer program according to the exemplary embodiment of the present invention may be compressed, or divided into multiple segments, and stored in a single or multiple recording media. It should be noted that it is a matter of course that computer program products according to exemplary embodiments of the present invention can be provided in various forms. The computer program product according to the exemplary embodiment of the present invention may include, for instance, a storing medium that stores the computer program, and a transmission medium that transmits the computer program.

The summary of the present invention does not exhaustively list all the necessary characteristics of the present invention. It should be noted that a combination or a subcombination of these configuration elements may also configure the present invention.

It is a matter of course that various modifications where hardware configuration elements of a computer used in an embodiment of the present invention are combined with multiple machines, and functions are distributed thereto may be easily assumed by those skilled in the art. These modifications are concepts involved in the spirit of the present invention as a matter of course. However, these configuration elements are only exemplified examples. Not all these configuration elements are the necessary configuration elements of the present invention.

The present invention may be implemented as hardware, software, and a combination of hardware and software. In execution through the combination of hardware and software, a typical example may be execution of the computer program in a computer where the computer program is installed. In such a case, the computer program is loaded into memory of the computer and executed, thereby allowing the computer program to control the computer and execute the processes according to the present invention. The computer program may include any language, code, or a group of instructions that can be expressed through representation. Such a group of instructions enables the computer to directly execute a specific function, or, after execution of one or both of 1. conversion into another language, code or representation, and 2. copying to another medium, to execute the specific function.

According to the embodiment of the present invention, as a sentence similar to a sentence contained in the target field corpus, a sentence efficiently covered by the template generated from the target field corpus can be selected from the out-of-target-field corpus. Therefore, according to the embodiment of the present invention, a technique of efficiently collecting the sentence similar to the sentence contained in the target field corpus from the out-of-target-field corpus that is a corpus in a field other than that of the target field corpus can be provided.

Furthermore, according to the embodiment of the present invention, the sentence similar to the sentence contained in the target field corpus can be collected from the out-of-target-field corpus without using a statistical model estimated from the target field corpus.

Moreover, according to the embodiment of the present invention, even if there is an unknown word in a sentence, the sentence similar to the sentence contained in the target field corpus can be collected from the out-of-target-field corpus, irrespective of the unknown word.

Exemplary embodiments of the present invention are hereinafter described with reference to the drawings. Throughout the following drawings, the same symbols denote the same objects unless otherwise noted. The exemplary embodiments of the present invention are for illustrating a preferred embodiment of the present invention. It should be understood that there is no intention to limit the scope of the present invention to that shown here.

For the varying embodiments of the present invention, "a corpus in a first domain" may be, for instance, a target field corpus. The "target field corpus" is a corpus in a field that is an object of an application (e.g., automatic speech recognition application, machine translation application, natural language processing application, optical character recognition (OCR) application), and particularly, a corpus in a field that is an object of an automatic speech recognition application. The "target field corpus" may be referred to as in-domain corpora.

In the embodiments of the present invention, a "corpus in a second domain" may be an out-of-target field corpus. The "out-of-target field corpora" are from a different field as the target of the application and a large amount of which contains corpora of documents which can be relatively easily collected. For instance, the corpora of the documents may be newspapers, crawled web text, or corpora of the social networking services. The "out-of-target field corpus" is also referred to as an out-of-domain corpora or general corpora.

In the embodiments of the present invention, a "language model" can be a language model based on word n-gram. According to the word n-gram, an object is segmented by units of words (e.g., in a language having word-segmentation-marks such as English) and a model is made according to units each including an arrangement of sequential n words. For scenarios where the value of n is one, two or three, the terms "unigram", "bigram", and "trigram" are used, respectively. In the embodiments of the present invention, word n-gram is typically word 2-gram, word 3-gram, or word 4-gram.

In the embodiments of the present invention, a "word string" can refer to any of: a word string selected from a corpus in the first domain, a word string where one or more words in the word string selected from the corpus in the first domain are replaced with a special symbol representing any word or word string, a word string selected from a corpus in a second domain, or a word string where one or more words in the word string selected from the corpus in the second domain are replaced with a special symbol representing any word or word string. Words in the word string can include BOS ("begin of sentence") and EOS ("end of sentence").

In the embodiments of the present invention, the "special symbol representing any word or word string" can be a wild card.

In an embodiment of the present invention, the "template" can be a word string subjected to replacement where one or more words in the word string selected from a corpus in the first domain are replaced with a special symbol. The special symbol can represent any word or word string, or a word string itself selected from the corpus in the first domain. In particular, the "template" may be acquired by replacing one or more words in a word string selected from the corpus in the first domain with the special symbol.

FIG. 1 is a diagram showing an example of a hardware configuration for a computer usable in an embodiment of the present invention. Computer (101) according to an embodiment of the present invention includes one or multiple computers. The multiple computers may have different hardware or software or different combinations of hardware and software. The multiple computers may be connected to each other directly or via a network. Computer (101) is not necessarily a physical computer, and can be a virtual machine realized on a computer installed in a data center or a cloud environment (e.g., SoftLayer® provided by International Business Machines Corporation®).

Computer (101) may be a desktop computer, a notebook computer, ultrabook, or a server computer. Computer (101) includes CPU (102) and main memory (103), which are connected to bus (104). Preferably, CPU (102) is based on a 32-bit or 64-bit architecture. CPU (102) may be Core™ i series, Core™ 2 series, Atom™ series, Xeon® series, Pentium® series or Celeron® series by Intel Corporation, A series, Phenom™ series, Athlon™ series, Turion™ series or Sempron™ series by AMD (Advanced Micro Devices), Inc., or Power™ series by International Business Machines Corporation.

Display (106) (e.g., a liquid crystal display ("LCD")) can be connected to bus (104) via display controller (105). The LCD can be a touch panel display or a floating touch display. Display (106) may be used for displaying information that is displayed through operation of software currently operating on computer (101).

Keyboard (111) and mouse (112) can be optionally connected to bus (104) via peripheral device controller (110) (e.g., a keyboard and mouse controller or a USB bus).

Storing device (108) (e.g., a hard disk or a solid state drive ("SSD")) and/or drive (109) (e.g., a CD, DVD or BD drive) can be optionally connected to bus (104) via SATA or IDE controller (107). Storing device (108) may store an operating system such as Windows® OS, UNIX®, Linux® (e.g., RedHat®, Debian®), MacOS®, and Java® execution environment such as J2EE, Java® application, Java® virtual machine (VM), a program that provides Java® just-in-time (JIT) complier, and various computer programs, and data, in a manner loadable to main memory (103).

Storing device (108) may be embedded in computer (101), connected via a cable (e.g. USB cable) or a wired or wireless network in a manner allowing computer (101) to access this device.

Drive (109) may be used for installing an operating system program or an application program into storing device (108) from a CD-ROM, DVD-ROM or BD, as necessary.

Communication interface (114) is in conformity with the Ethernet® protocol. Communication interface (114) is connected to bus (104) via communication controller (113), plays a role of connecting computer (101) to communication line (115) in a wired or wireless manner, and provides a network interface layer for the TCP/IP communication protocol of a communication function of the operating system of computer (101). The communication line may be a wired LAN environment in conformity with wired LAN connection standards, or a wireless LAN environment in conformity with wireless LAN connection standards (e.g., a Wi-Fi wireless LAN environment, such as IEEE802.11a/b/g/n), or a mobile phone network environment (e.g., 3G or 4G/LTE environment).

Computer (101) can receive data from another apparatus (e.g., another computer, server computer, or a network attached storage) via communication line (115), and store the data in storing device (108).

Referring to FIG. 2A, an embodiment of the present invention is shown as a diagram for replacing one or more words in a word string selected from a target field corpus with a special symbol. Then, adopting the word string replaced with the special symbol as the template for selecting training text, and selecting text covered by the template as training text for a language model from an out-of-target field corpus.

Furthermore, FIG. 2A shows an example of a case where sentences stored in the target field corpus is in English. In step 201, computer (101) takes one English language sentence, "He arrived at Tokyo now", from target field corpus (221). Computer (101) removes periods in the sentence, otherwise periods will be treated as normal words.

In step 202, computer (101) adds a symbol <bos> indicating BOS before the sentence taken from target field corpus (221), and adds a symbol <eos> indicating EOS at the end of the sentence. The resulting sentence is "<bos> He arrived at Tokyo now <eos>".

In step 203, computer (101) segments the sentence "<bos> He arrived at Tokyo now <eos>" into words and then lists word 3-gram as a unit. In other words, Computer (101) selects a word string that includes three words from the sentence "<bos> He arrived at Tokyo now <eos>" while shifting word-by-word such that the word string is generated as a segmented result into the word 3-gram unit is as follows: "<bos> He arrived", "He arrived at", "arrived at Tokyo", "at Tokyo now", "Tokyo now <eos>". In the segmentation to the word 3-gram unit, each of the symbols <bos> and <eos> are treated as one word.

In step 203, computer (101) replaces the word in the middle of each segmented word 3-gram word string unit with a special symbol (e.g., asterisk) representing any word. The partially blanked word string generated as the result of the replacement is as follows: "<bos>*arrived", "He*at", "arrived*Tokyo", "at*now", "Tokyo*<eos>". Accordingly, the resulting word string may be referred to as a partially blanked word string due to the partially blanked word 3-gram.

Computer (101) repeatedly performs steps 201 to 203 for all sentences that are taken from target field corpus (221) and other than the aforementioned sentence.

In step 204, computer (101) adopts, as a template for selecting training text, the word string generated as the result of the replacement. Computer (101) can optionally extract and acquire the template having a high number of occurrences from among the templates generated in step 204 by the repeated execution of steps 201 to 203 for all the sentences in target field corpus (221).

In the following description, it is assumed that all the templates acquired in step 204 are used.

In step 211, computer (101) takes the English language sentence "He arrived at Boston now" from out-of-target field corpus (223). Computer (101) then removes the period in the sentence as performed in step 201. If the period is not removed in step 201, computer (101) does not remove the period in the sentence.

In step 212, as with the process described in the foregoing step 202, computer (101) adds the symbol "<bos>" indicating BOS before the sentence taken from out-of-target field corpus (223), and adds the symbol "<eos>" indicating EOS at the end of the sentence. The resulting sentence is "<bos> He arrived at Boston now <eos>".

In step 213, computer (101) segments the sentence "He arrived at Boston now" into words and then lists word 3-gram units included in the result as described in step 203. The word string generated results in the segmented word 3-gram units as follows: "<bos> He arrived", "He arrived at", "arrived at Boston", "at Boston now", "Boston now <eos>".

In step 213, computer (101) replaces the word in the middle of each segmented word 3-gram word string unit with a special symbol (e.g., asterisk) representing any word. The partially blanked word string generated as the result of the replacement is as follows: "<bos>*arrived", "He*at", "arrived*Boston", "at*now", "Boston*<eos>".

In step 214, computer (101) determines whether the partially blanked word string generated in step 213 is covered by the template generated in step 204. That is, computer (101) determines whether the partially blanked word string generated in step 213 matches with the template generated in step 204. As shown in FIG. 2A, three partially blanked word strings, "<bos>*arrived", "He*at", and "at*now", among five partially blanked word strings match with the template.

In step 215, computer (101) calculates the coverage rate of the partially blanked word string generated in step 213 being covered by the template generated in step 204. As described above, the three partially blanked word strings among the five partially blanked word strings match with the template. Accordingly, the coverage rate is 60% (3/5×100).

In step 216, computer (101) selects a sentence having a coverage rate of at least a prescribed value as training text. Here, it is assumed that the setting is configured such that a sentence having a coverage rate of at least 50% is selected as training text. Accordingly, since the coverage rate for the sentence "He arrived at Tokyo now" is 60%, computer (101) selects the sentence "He arrived at Tokyo now" as training text. The sentence selected as training text is usable for training a language model. The sentence selected from out-of-target field corpus (223) is new training text that is not in target field corpus (221) in consideration of training the language model.

Referring to FIG. 3A, a diagram for adopting a word string selected from a target field corpus as a template for selecting training text, and selecting text covered by the template as training text for a language model is shown.

FIG. 3A shows an example of a case where sentences stored in the target field corpus are in English.

In step 301, computer (101) takes an English language sentence "He arrived at Tokyo now" from target field corpus (321). Computer (101) removes the period in the sentence. Alternatively, if the period is not removed, the period is treated as one word as with a normal word.

In step 302, computer (101) adds a symbol "<bos>" indicating BOS before the sentence taken from target field corpus (321), and adds a symbol "<eos>" indicating EOS at the end of the sentence. The resulting sentence is "<bos> He arrived at Tokyo now <eos>".

In step 303, computer (101) segments the sentence "He arrived at Tokyo now" into words and then lists word 2-gram units included in the result. That is, computer (101) selects a word string that includes two words from the sentence "He arrived at Tokyo now" while shifting word-by-word. The word string generated results in segmented word 2-gram units as follows: "<bos> He", "He arrived", "arrived at", "at Tokyo", "Tokyo now", "now <eos>".

As shown in the result, the segmentation to word 2-gram units treats each of the symbols <bos> and <eos> as single words.

Computer (101) repeatedly performs steps 301 to 303 for each of the sentences that are taken from target field corpus (321).

In step 304, computer (101) adopts the generated word string as a template for selecting training text. Computer (101) can optionally extract the template that has a higher number of occurrences of the same word string as that of the template than a prescribed number from among the templates in step 304, on the basis of the result of repeatedly executed steps 301 to 303 for each of all the sentences in target field corpus (321). That is, computer (101) can extract templates having the higher number of occurrences than the prescribed number from among the templates in step 304.

In the following description, it is assumed that all of the templates that are acquired in step 304 are used.

In step 311, computer (101) takes the English language sentence "He arrived at Boston now" from out-of-target field corpus (323). Computer (101) then removes the period in the sentence according step 301. If the period is not removed in step 301, the computer (101) does not remove the period in the sentence.

In step 312, as with step 302, computer (101) adds the symbol "<bos>" indicating BOS before the sentence taken from out-of-target field corpus (323), and adds the symbol "<eos>" indicating EOS at the end of the sentence. The resulting sentence is: "<bos> He arrived at Boston now <eos>".

In step 313, computer (101) segments the sentence "He arrived at Boston now" into words and then lists word 2-gram units included in the result as in step 303. The word string generated results in segmented word 2-gram units as follows: "<bos> He", "He arrived", "arrived at", "at Boston", "Boston now", "now <eos>".

In step 314, computer (101) determines whether the word string generated in step 313 is covered by the template generated in step 304. That is, computer (101) determines whether the word string generated in step 313 matches with the template generated in step 304. As shown in FIG. 3A, four word strings ("<bos> He", "He arrived", "arrived at", and "now <eos>") among six word strings match with the template.

In step 315, computer (101) calculates the coverage rate of the word string generated in step 313 being covered by the template generated in step 304. As described above, the four word strings among the six word strings match with the template. Accordingly, the coverage rate is about 67% (=(4/6)×100).

In step 316, computer (101) selects a sentence having a coverage rate of at least a prescribed value as training text. Here, it is assumed that the setting is configured such that a sentence having a coverage rate of at least 60% is selected as training text. Accordingly, since the coverage rate for the sentence "He arrived at Tokyo now" is 67%, computer (101) selects the sentence "He arrived at Tokyo now" as training text. The sentence selected as training text is usable for training a language model. The sentence selected from out-of-target field corpus (323) is new training text that is not in target field corpus (321) in consideration of training the language model.

FIG. 4A shows a flowchart for a process of replacing one or more words in a word string selected from a target field corpus with a special symbol, and adopting the word string after replacement as a template for selecting training text, according to the embodiment of the present invention. FIG. 4B shows a flowchart for a process of selecting text covered by the template generated as training text from an out-of-target field corpus, according to the embodiment of the present invention.

In step 401, computer (101) starts a process of replacing one or more words in a word string selected from target field corpus (491) with a special symbol, and adopting the word string replaced with the special symbol as a template for selecting training text.

In step 402, computer (101) selects one sentence that includes a word string from target field corpus (491). Computer (101) may remove the period and punctuation marks from the sentence taken from target field corpus (491). Alternatively, if the punctuation marks are not removed, each punctuation mark is treated as one word. The timing of removing the punctuation marks may be after execution of word segmentation in the following step 405. For instance, in the case where the word segmentation in step 405 is performed statistically, if the model for word segmentation is trained without punctuation marks, it is preferred that the punctuation marks be removed before execution of the word segmentation. On the contrary, if the model for word segmentation is trained with the punctuation marks, it is preferred that the punctuation marks be removed after execution of the word segmentation.

In step 403, computer (101) determines whether to add the symbol representing BOS (e.g., <bos>) before the sentence selected in step 502 or the sentence from which the period and punctuation mark have been removed, and add the symbol representing EOS (e.g., <eos>) at the end of the sentence or not. Computer (101) advances the processing to step 404 according to the symbol being added. On the contrary, computer (101) advances the processing to step 405 according to the symbol being not added.

In step 404, computer (101) adds the symbol representing BOS before the sentence selected in step 402 or the sentence from which the period and punctuation mark have been removed, and adds the symbol representing EOS at the end of the sentence.

Note that in the flowchart shown in FIG. 4A, processes of steps 403 and 404 may be preliminarily omitted.

In step 405, computer (101) generates a template for selecting training text from among word strings in a sentence in target field corpus (491) or a sentence subjected to a process of step 404 (hereinafter, referred to as a "sentence selected from target field corpus (491)"; the selected sentence is also a word string). Computer (101) replaces one or more words in the word strings in the sentence selected from target field corpus (491) with a special symbol representing any word or word string, and generates a word string replaced with the special symbol. Computer (101) then adopts the word string after replacement as the template.

Replacement of one or more words in the word string with the special symbol representing any word or word string may be on a word at any position in the sentence selected from target field corpus (491). For instance, the word at any position may be one or more words from the beginning of the selected word string; one or more words between the first word and the last word in the selected word string; or one or more words from the end of the selected word string.

In step 405, computer (101) can segment the sentence selected from target field corpus (491) into words, and then list word n-gram included in the result as a unit. Instead of word segmentation, morphological analysis may be performed for the sentence. The morphological analysis is a more advanced process that assigns parts of speech at the same time of the word segmentation. Since parts of speech are not required in this embodiment of the present invention, only the process of word segmentation is sufficient. Here, in the word n-gram, n may be two to four. In particular, n may be two or three. That is, computer (101) selects word strings each including n words from the sentence selected from target field corpus (491) while shifting word-by-word. If the word string contains the special symbol in the segmentation to the units of word n-gram, the special symbol is processed as one word. If the word string contains a period or a punctuation mark in the segmentation to units of word n-gram, each period and punctuation mark is processed as one word. Computer (101) then replaces one or more words in the word string generated as the segmented result of the segmentation to the units of word n-gram with a special symbol representing any word or word string. In the word string replaced with the special symbol, one word in the word string generated as the result of the segmentation to the units of the word n-gram is replaced with the special symbol. Accordingly, the string may also be referred to as a partially blanked word string due to partially blanked word n-gram. That is, in word n-gram for any n, where n is an integer, the position at the middle or the beginning or the end (in particular, at the middle) may be blanked.

In step 406, computer (101) determines whether there is any sentence to which processes of steps 402 to 405 have not been applied yet in target field corpus (491). Computer (101) returns the processing to step 402 if there is a sentence having not been subjected to the processes yet, and repeats steps 402 to 406. On the contrary, computer (101) advances the processing to step 407 if all sentences have been subjected to the processes.

According to the repetition of steps 402 to 406, computer (101) can calculate the frequency of occurrence of the template generated in step 405 using a counter. Furthermore, computer (101) may associate the template generated in step 405 with the occurrence frequency.

In step 407, computer (101) extracts templates where the same word string as that of the template occurs more than the prescribed times, from among the templates generated in step 405.

If the prescribed number is set to one, computer (101) extracts all the templates generated in step 405.

Furthermore, in step 407, computer (101) can store the extracted templates in recording medium (492) that stores the templates.

Note that in the flowchart shown in FIG. 4A, the template extraction process shown in step 407 may be preliminarily omitted.

In step 408, computer (101) finishes the processes that replace one or more words in the word string selected from the target field corpus with the special symbol, and adopt the word string replaced with the special symbol as the template for selecting the training text.

Referring to FIG. 4B, the process of selecting training text for language model according to the present invention is shown.

In step 411, computer (101) starts a process of selecting, from out-of-target field corpus (493), text covered by the template generated in step 405 of FIG. 4A or the template extracted in step 407 as training text for a language model.

In step 412, computer (101) selects one sentence from out-of-target field corpus (493). Computer (101) may remove a period or a punctuation mark in the sentence taken from out-of-target field corpus (493), according to the removal of the period or punctuation mark in step 402.

In step 413, as with the foregoing step 403, computer (101) determines whether or not to add the symbol representing BOS before the sentence selected in step 412 or the sentence from which the period and punctuation mark have been removed, and add the symbol representing EOS at the end of the sentence. Computer (101) advances the processing to step 414 according to a fact that the symbols have been added in step 403. On the contrary, computer (101) advances the processing to step 415 if the symbols have not been added in step 403.

In step 414, computer (101) adds the symbol representing BOS before the sentence selected in step 412 or the sentence from which the period and punctuation mark have.

If the processes of steps 403 and 404 shown in FIG. 4A are preliminarily omitted, processes of steps 413 and 414 are preliminarily omitted also as in the flowchart shown in FIG. 4B in an analogous manner.

In step 415, computer (101) generates a word string according to the same generation technique as the technique of generating the template shown in step 405 of FIG. 4A. That is, computer (101) can segment the sentence in out-of-target field corpus (493) or the sentence subjected to the process of step 414 (hereinafter, referred to as the "sentence selected from out-of-target field corpus (493)) into words, and then list the word units according to word n-gram included in the result. Here, in the case of the word n-gram, n is the same value as that in step 405.

Subsequently, as described with reference to step 405 of FIG. 4A, in step 415 computer (101) replaces one or more words in the word string generated as the segmented result of the segmentation to the units of word n-gram with the special symbol representing any word or word string and thus generates the word string replaced with the special symbol.

In step 416, computer (101) reads the template generated in step 405 of FIG. 4A or the template extracted in step 407 from recording medium (492) that stores the templates, and then calculates the coverage rate of the word string generated in step 415 being covered by the template read from recording medium (492). The coverage of the word string with the template is that this word string matches with the word string in the template. Note that if the template contains a special symbol (e.g., asterisk) representing any word, the character in the word string corresponding to the special symbol in the template may be any word. Computer (101) may not only simply calculate the coverage rate but also provide degrees of importance for the respective templates and use the weighted coverage rate based on the degree of importance. For instance, the degree of importance may be set based on how frequently the word string occurs in target field corpus (491). In the calculation of the coverage rate, computer (101) lists the word strings from out-of-target field corpus (493) using the same generation technique as that for extracting the template, and checks whether the listed word strings are covered by the template or not. The numbers of denominators for calculating the coverage rates are determined on the basis of the sentences as the embodiment of out-of-target field corpus (493). Accordingly, in the calculation of the coverage rate, the case where the sentence contained in target field corpus (491) has a length different from the length of the sentence contained in out-of-target field corpus (493) causes no problem.

In step 417, computer (101) selects the sentence having the coverage rate calculated in step 417 of at least a prescribed value as training text for a language model. Computer (101) may store the training text in a recording medium (494) that stores the training text.

In step 418, Computer (101) determines whether or not there is any sentence having not been subjected to the processes of steps 412 to 417 yet in out-of-target field corpus (493). According to a fact that there is a sentence having not been subjected to the processes yet, computer (101) returns the processing to step 412 and repeats steps 412 to step 418. On the contrary, according to a fact that there is no sentence having not been subjected to the processes yet, computer (101) advances the processing to a finish step 419.

In step 419, computer (101) finishes the process of selecting the template from the training text for the language model from the out-of-target field corpus.

FIG. 5A and FIG. 5B show a flowchart for a process of adopting the word string selected from the target field corpus as a template for selecting training text, and a flowchart for a process of selecting, from the out-of-target field corpus, text covered by the generated template as the training text for the language model, respectively, according to the embodiment of the present invention.

In step 501, computer (101) starts a process of adopting the word string selected from target field corpus (591) as a template for selecting training text.

In step 502, computer (101) selects one sentence (including a word string) from target field corpus (591). Computer (101) may remove the period and punctuation marks from the sentence taken from target field corpus (591). Alternatively, computer (101) does not necessarily remove the period. If the punctuation marks are not removed, each of the punctuation marks is treated as one word as with a normal word. The timing of removing the punctuation marks may be after execution of word segmentation in the following step 505. For instance, in the case where the word segmentation in step 505 is performed statistically, if the model for word segmentation is trained without punctuation marks, it is preferred that the punctuation marks be removed before execution of the word segmentation. On the contrary, if the model for word segmentation is trained with the punctuation marks, it is preferred that the punctuation marks be removed after execution of the word segmentation.

In step 503, computer (101) determines whether to add the symbol representing BOS (e.g., <bos>) before the sentence selected in step 502 or the sentence from which the full stop and punctuation mark have been removed, and add the symbol representing EOS (e.g., <eos>) at the end of the sentence or not. Computer (101) advances the processing to step 504 according the symbol being added. On the contrary, computer (101) advances the processing to step 505 according to the symbol being not added.

In step 504, computer (101) adds the symbol representing BOS before the sentence selected in step 502 or the sentence from which the full stop and punctuation mark have been removed, and adds the symbol representing EOS at the end of the sentence.

Note that in the flowchart shown in FIG. 5A, the processes of steps 503 and 504 may be preliminarily omitted.

In step 505, computer (101) generates a template for selecting training text from the sentence in target field corpus (591) or the sentence subjected to the process of step 504 (hereinafter, referred to as a "sentence selected from target field corpus (591)"; the selected sentence is also a word string). Computer (101) adopts the sentence selected from target field corpus (591) as the template.

In step 505, computer (101) can segment the sentence selected from target field corpus (591) into words, and then list word n-gram included in the result as a unit. Instead of word segmentation, morphological analysis may be performed for the sentence. The morphological analysis is a more advanced process that assigns parts of speech at the same time of the word segmentation. Since parts of speech are not required in the embodiment of the present invention, the process of word segmentation is sufficient. Here, in the word n-gram, n is, for instance, two to four. In particular, n may be two or three. That is, computer (101) selects word strings each including n words from the sentence selected from target field corpus (591) and adopts the strings as a template while shifting word-by-word. If the word string contains the special symbol in the segmentation to the units of word n-gram, the special symbol is processed as one word. If the word string contains the period or punctuation mark in the segmentation to units of word n-gram, each of the period and the punctuation marks is processed as one word.

In step 506, computer (101) determines whether there is any sentence to which the processes of steps 502 to 505 have not been applied yet in target field corpus (591) or not. Computer (101) returns the processing to step 502 according to a fact that there is a sentence having not been subjected to the processes yet, and repeats steps 502 to 506. On the contrary, computer (101) advances the processing to step 507 according to a fact that there is no sentence having not been subjected to the processes yet.

According to repetition of steps 502 to 506, computer (101) can calculate the frequency of occurrence of the template generated in step 505 using, for instance, a counter. Furthermore, computer (101) may associate the template generated in step 505 with the occurrence frequency.

In step 507, computer (101) extracts templates where the same word string as that in the template occurs more than prescribed times, from among the templates generated in step 505.

If the prescribed number is set to one, computer (101) extracts all the templates generated in step 505.

In step 507, furthermore, computer (101) may store the extracted templates in recording medium (592) that stores the templates.

Note that in the flowchart shown in FIG. 5A, the template extraction process shown in step 507 may be preliminarily omitted.

In step 508, computer (101) finishes the process of adopting the word string selected from the target field corpus as the template for selecting the training text.

In step 511, computer (101) starts a process of selecting, from out-of-target field corpus (593), text covered by the template generated in step 505 in FIG. 5A or the template extracted in step 507 as training text for a language model.

In step 512, computer (101) selects one sentence from out-of-target field corpus (593). Computer (101) may remove the full stop or punctuation mark in the sentence taken from out-of-target field corpus (593), according to the removal of the full stop or punctuation mark in step 502.

In step 513, computer (101), as with the foregoing step 503, computer (101) determines whether or not to add the symbol representing BOS before the sentence selected in step 512 or the sentence from which the full stop and punctuation mark have been removed, and add the symbol representing EOS at the end of the sentence. Computer (101) advances the processing to step 514 according to a fact that the symbols have been added in step 503. On the contrary, computer (101) advances the processing to step 515 according to a fact that the symbols have not been added in step 503.

In step 514, computer (101) adds the symbol representing BOS before the sentence selected in step 512 or the sentence from which the full stop and punctuation mark have been removed, and adds the symbol representing EOS at the end of the sentence.

If the processes of steps 503 and 504 shown in FIG. 5A are preliminarily omitted, processes of steps 513 and 514 are preliminarily omitted also in the flowchart shown in FIG. 5B in an analogous manner.

In step 515, computer (101) generates a word string according to the same generation technique as the technique of generating the template shown in step 505 of FIG. 5A. That is, computer (101) acquires a word string in the sentence in out-of-target field corpus (593), or the sentence subjected to the process of step 514 (hereinafter, referred to as a "sentence selected from out-of-target field corpus (593)").

In step 515, for instance, computer (101) can segment the sentence selected from out-of-target field corpus (593) into words, and then list word n-gram contained in the result. Here, in the word n-gram, n has the same value as that in step 505. Computer (101) selects a word string containing n words from the sentence selected from out-of-target field corpus (593) while shifting word-by-word. If the word string contains the special symbol in the segmentation to units of word n-gram, the special symbol is processed as one word. If the word string includes the full stop or punctuation mark in the segmentation to units of word n-gram, each of the full stop and the punctuation marks is processed as one word.

In step 516, computer (101) reads the template generated in step 505 of FIG. 5A or the template extracted in step 507 from recording medium (592) that stores the templates, and then calculates the coverage rate of the word string generated in step 515 being covered by the template read from recording medium (592). The coverage of the word string with the template is that this word string matches with the word string in the template. Note that if the template contains a special symbol (e.g., asterisk) representing any word, the character in the word string corresponding to the special symbol in the template may be any word. Computer (101) may not only simply calculate the coverage rate but also provide degrees of importance for the respective templates and use the weighted coverage rate based on the degree of importance. For instance, the degree of importance may be set based on how frequently the word string occurs in target field corpus (591). In the calculation of the coverage rate, computer (101) lists the word strings from out-of-target field corpus (593) using the same generation technique as that for extracting the template, and checks whether the listed word strings are covered by the template or not. The numbers of denominators for calculating the coverage rates are determined on the basis of the sentences as the embodiment of out-of-target field corpus (593). Accordingly, in the calculation of the coverage rate, the case where the sentence contained in target field corpus (591) has a length different from the length of the sentence contained in out-of-target field corpus (593) causes no problem.

In step 517, computer (101) selects the sentence having the coverage rate calculated in step 516 of at least a prescribed value as training text for a language model. Computer (101) may store the training text in recording medium (594) that stores the training text.

In step 518, computer (101) determines whether or not there is any sentence having not been subjected to the processes of steps 512 to 517 yet in out-of-target field corpus (593). According to a fact that there is a sentence having not been subjected to the processes yet, computer (101) returns the processing to step 512 and repeats steps 512 to step 518. On the contrary, according to a fact that there is no sentence having not been subjected to the processes yet, computer (101) advances the processing to a finish step 519.

In step 519, computer (101) finishes the process of selecting, from the out-of-target field corpus, the text covered by the template as the training text for the language model.

FIG. 6 is a flowchart for a process of training a language model using training text according to the embodiment of the present invention. The computer that executes each step shown in FIG. 6 may be the same as or different from the computer that executes each step in FIG. 4A and FIG. 4B or the computer that executes each step in FIG. 5A and FIG. 5B.

In step 601, computer (101) starts a process of training a language model using the training text selected by the process shown in FIG. 4B, the training text selected by the process shown in FIG. 5B, or a combination thereof (hereinafter, integrally referred to as "training text").

In step 602, computer (101) reads the training text from recording medium (694) that stores the training text, and trains the language model using the read training text. Note that the training text for training the language model is also referred to as a training corpus.

Furthermore, in step 602, computer (101) may train the language model based on word n-gram from target field corpus (691). The method of segmenting the target field corpus into words to acquire segmented word strings can acquire word strings that can be acquired by a conventional method known to those skilled in the art.

In step 603, computer (101) finishes the process of training the language model using the training text.

FIG. 7 is a diagram showing an example of a functional block diagram of a computer that preferably has a hardware configuration according to FIG. 1, and executes the embodiment of the present invention according to the flowcharts of FIGS. 4A and 4B or FIG. 5A and FIG. 5B, and FIG. 6. Hereinafter, "unit" may be replaced with "means".

Computer (701) may correspond to computer (101) shown in FIG. 1.

Computer (701) may be an apparatus that executes each step of the flowcharts of FIG. 4A and FIG. 4B or FIG. 5A and FIG. 5B.

Computer (701) includes template generating unit (711), training text selecting unit (712) and, optionally, language model training unit (713).

Template generating unit (711) generates template (792) for selecting training text from a corpus that is target field corpus (791), according to at least one generation technique of (1) a generation technique of replacing one or more words in the word string selected from the corpus that is target field corpus (791) with a special symbol representing any word or word string, and adopting the word string replaced with the special symbol as template (792) for selecting training text, and (2) a generation technique of adopting the word string selected from the corpus that is target field corpus (791) as template (792) for selecting the training text.

Template generating unit (711) can extract templates (792) that occur more than prescribed times from among generated templates (792).

Template generating unit (711) can execute each step shown in FIG. 4A and/or each step shown in FIG. 5A.

Training text selecting unit (712) selects text covered by template (792) as training text (794) from out-of-target field corpus (793) different from target field corpus (791).

Training text selecting unit (712) can generate a word string with respect to each sentence in out-of-target field corpus (793) according to the same generation technique as the technique of generating template (792) generated by template generating unit (711), and select text covered by template (792) as training text (794) from out-of-target field corpus (793) that is different from target field corpus (791), using the word string generated according to the same generation technique, and generated template (792).

Training text selecting unit (712) can generate a word string for each sentence with respect to each sentence in out-of-target field corpus (793) according to the same generation technique as the technique of generating generated template (792), calculate the coverage rate of the word string generated according to the same generation technique being covered by template (792), and select, as training text (794), sentences having the calculated coverage rate of at least a prescribed value.

In the case of extracting templates (792) that occur more than prescribed times from among templates (792) generated by template generating unit (711), training text selecting unit (712) can select text covered by extracted template (792) from out-of-target field corpus (793) as training text (794).

Training text selecting unit (712) can generate a word string with respect to each sentence in out-of-target field corpus (793) according to the same generation technique as the technique of generating extracted template (792), and select text covered by template (792) as training text (794) from out-of-target field corpus (793) different from target field corpus (791), using the word string generated according to the same generation technique and extracted template (792).

Training text selecting unit (712) can generate a word string with respect to each sentence in out-of-target field corpus (793) according to the same generation technique of the technique of generating extracted template (792), calculate the coverage rate of the word string generated according to the same generation technique being covered by extracted template (792), and select the sentences having the calculated coverage rate of at least the prescribed value as training text (794).

Training text selecting unit (712) can execute each step shown in FIG. 4B and/or each step shown in FIG. 5B.

Language model training unit (713) trains the language model using training text (794).

Language model training unit (713) can execute each step shown in FIG. 6.

For example, text (target field corpus) transcribed by ear of a person from utterance on a task for automatic speech recognition was prepared. Computer (701) replaced, with a special symbol, one or more words in the word string selected from the prepared target field corpus, according to the embodiment of the present invention, adopted the word string replaced with the special symbol as a template for selecting training text. Computer (701) then selected text covered by the template as the training text for a language model from the out-of-target field corpus.

Furthermore, computer (701) segmented the prepared target field corpus into words and acquired segmented word strings, according to a conventional technique known to those skilled in the art.

Computer (701) then trained the language model using the selected training text and the segmented word strings acquired from the target field corpus. Computer (701) performed an automatic speech recognition experiment (Example) using the trained language model.

As a comparative example, computer (701) trained the same language model as that of the previous example using only the segmented word strings acquired from the target field corpus. Computer (701) performed an automatic speech recognition experiment (comparative example) using the trained language model.

As a result, the speech recognition based on Example was improved in error rate by 0.75% in comparison with the speech recognition based on the comparative example.

The invention claimed is:

1. A computer-implemented method for selecting training text for a language model comprising the steps of:

generating, from a first corpus in a first domain, a template for selecting the training text, wherein generating the template comprises:
  identifying a first plurality substrings in a first word string selected from the first corpus; and
  replacing a respective word in each substring of the first plurality of substrings with a special symbol that can represent any word or word string to generate a second plurality of substrings, wherein each respective word replaced with the special symbol occurs at a same position in a corresponding substring of the first plurality of substrings;
adding the second plurality of substrings to the template for selecting the training text;
identifying text that is included in a second corpus in a second domain different from the first domain and that is covered by the template;
selecting the text as at least a portion of the training text, wherein selecting the text comprises:
  generating a third plurality of substrings of a second word string selected from the second corpus;
  calculating a coverage rate between the third plurality of substrings and the second plurality of substrings;
  determining that the coverage rate is at least as great as a prescribed value, and
  selecting the second word string as at least a portion of the training text based at least in part on determining that the coverage rate is at least as great as the prescribed value; and
training the language model using the selected training text.

2. The method according to claim 1, wherein the step of generating the template further comprises determining that the template occurs more than a threshold number of times in the first corpus in the first domain and selecting the template from among a plurality of candidate templates.

3. The method according to claim 2, wherein the step of selecting the text as the at least a portion of the training text comprises:
  generating a respective word string according to the extracted template with respect to each sentence in the second corpus in the second domain; and
  selecting the text as the at least a portion of the training text from the second corpus in the second domain using at least one respective word string generated according to the extracted template.

4. The method according to claim 1, wherein the step of selecting the text as the at least a portion of the training text comprises:
  generating a respective word string according to the extracted template with respect to each sentence in the corpus in the second domain;
  calculating a coverage rate of each respective word string generated according to the extracted template; and
  selecting a sentence having the calculated coverage rate of at least a prescribed value as the at least a portion of the training text.

5. The method according to claim 1, wherein the language model is a language model based on word n-gram.

6. The method according to claim 1, wherein the special symbol is a wild card.

7. The method according to claim 1, wherein the first corpus in the first domain is a target field corpus and the second corpus in the second domain is an out-of-target field corpus.

* * * * *